(12) United States Patent
Holas

(10) Patent No.: US 10,840,036 B2
(45) Date of Patent: Nov. 17, 2020

(54) SYSTEM FOR POSITIONING A MEDICAL DEVICE

(71) Applicant: Linet spol S.R.O., Slany (CZ)

(72) Inventor: David Holas, Ceska Lipa (CZ)

(73) Assignee: Linet spol. s.r.o., Slany (CZ)

(*) Notice: Subject to any disclaimer, the term of this patent is extended or adjusted under 35 U.S.C. 154(b) by 144 days.

(21) Appl. No.: 16/130,369

(22) PCT Filed: Feb. 23, 2017

(86) PCT No.: PCT/CZ2017/000010
§ 371 (c)(1),
(2) Date: Sep. 13, 2018

(87) PCT Pub. No.: WO2017/157353
PCT Pub. Date: Sep. 21, 2017

(65) Prior Publication Data
US 2019/0122838 A1 Apr. 25, 2019

(30) Foreign Application Priority Data
Mar. 18, 2016 (CZ) .................................. 2016-162

(51) Int. Cl.
| | |
|---|---|
| *H01H 13/702* | (2006.01) |
| *H01H 9/02* | (2006.01) |
| *A61G 7/018* | (2006.01) |
| *A61G 7/015* | (2006.01) |
| *G05B 9/02* | (2006.01) |
| *H01H 35/14* | (2006.01) |

(52) U.S. Cl.
CPC .......... *H01H 13/702* (2013.01); *A61G 7/015* (2013.01); *A61G 7/018* (2013.01); *G05B 9/02* (2013.01); *H01H 9/0235* (2013.01); *H01H 35/14* (2013.01); *A61G 2203/12* (2013.01); *A61G 2203/36* (2013.01); *H01H 2300/052* (2013.01)

(58) Field of Classification Search
CPC .... H01H 35/14; H01H 13/702; H01H 9/0235; H01H 2300/052; A61G 2203/12; A61G 7/018; A61G 2203/36; G05B 9/02
See application file for complete search history.

(56) References Cited

U.S. PATENT DOCUMENTS

| | | | |
|---|---|---|---|
| 2004/0111800 A1* | 6/2004 | Bartels | A61G 7/1019 |
| | | | 5/600 |
| 2008/0098525 A1 | 5/2008 | Doleschal | |
| 2008/0150902 A1* | 6/2008 | Edpalm | G06F 3/041 |
| | | | 345/173 |
| 2011/0018814 A1 | 1/2011 | Kruglick | |

(Continued)

OTHER PUBLICATIONS

WIPO, International Search Report, dated Jul. 3, 2017, in International Application No. PCT/CZ2017/000010, filed Feb. 18, 2016.

(Continued)

*Primary Examiner* — Jared Fureman
*Assistant Examiner* — Duc M Pham
(74) *Attorney, Agent, or Firm* — Thedford I. Hitaffer; Hitaffer & Hitaffer, PLLC

(57) ABSTRACT

The subject of the invention is a medical device positioning system intended to increase resistance to accidental activation. This is accomplished using two independent systems to configure the actuator in the given position.

18 Claims, 4 Drawing Sheets

(56) References Cited

U.S. PATENT DOCUMENTS

2014/0039351 A1* 2/2014 Mix .................. A61B 5/1114
                                                600/587
2015/0272657 A1* 10/2015 Yates ............... A61B 18/1233
                                                606/34

OTHER PUBLICATIONS

WIPO, Written Opinion, dated Jul. 3, 2017, in International Application No. PCT/CZ2017/000010, filed Feb. 18, 2016.

* cited by examiner

SYSTEM FOR POSITIONING A MEDICAL DEVICE

This application, filed under 35 USC 371, is a United States National Stage Application of International Application No. PCT/CZ2017/000010, filed Feb. 23, 2017, which claims priority to CZ Application No. PV 2016-162, filed on Mar. 18, 2016, the disclosures of which are incorporated herein by reference.

TECHNICAL FIELD

The invention applies to a verification system used in the control of medical devices.

CURRENT STATE OF TECHNOLOGY

Currently, great emphasis is placed on the safety of medical devices, especially resistance to accidental launch of medical device functions, for example, due to accidental activation of a control element or due to a technical fault.

In current technology, systems are known where a dual protection system has been introduced as described in patent number EP0863360, where hospital beds have a system with two independent contacts switched by a single actuator button, and the actuators are become active only if signals come from both contacts.

There are also known systems where a tap on the surface of a device containing an accelerometer is detected, as described, for example, in patent application number US20100256947. The device contains a three-axis accelerometer which can distinguish the difference between a tap and double tap on the surface, for example, of a music player, but also the direction of the tapping, which can be used, for example, for the scrolling function of a menu.

A similar system as in patent application number US20100256947 is described in U.S. Pat. No. 7,999,797, where the device compares data measured by the accelerometer after tapping, for example, on the screen of a device, with the reference data, from which it then evaluates the place where there was a tap.

A similar system as in patent application number US20100256947 is described in patent application number WO2010047932, where the device evaluates whether an intentional tap on a surface such as on a mobile telephone or a false signal based on a certain exceeded threshold value measured by the accelerometer is involved.

The aforementioned solutions in documents WO2010047932, U.S. Pat. No. 7,999,797, and US2010025694 apply to touchscreen displays, MP3 players, telephones etc.

The disadvantage of the aforementioned systems is the need to detect a wide range of forces applied to the control, the use of filtering tools being necessary to evaluate a tap. Given the complexity of configuring how data is filtered from the accelerometer for a wide range of forces applied to the control, there may be incorrect evaluation of the relevance of the signal, for example a light tap or a very strong tap may be filtered out as an irrelevant signal or a random signal may be evaluated as relevant, both states being unacceptable, especially in a hospital environment.

Another disadvantage of the aforementioned systems, apart from patent number EP0863360, consists of the fact that they do not deal with the state of a single error. Although the system of patent number EP0863360 deals with the state of a single error, it does so in an unsuitable way, because the system is incapable of evaluating whether it involves an intentional press or, for example, something knocking against the device or someone lying on it. If there is an incorrect evaluation and a false signal is sent, this state is unacceptable in a device where an unintended movement may cause a risk situation for the user. Such resources consist of various medical devices with movable parts, such as hospital beds, nursing beds, transport beds, transport chairs, bedside cabinets, medical equipment holders, anti-decubitus mattresses, or patient lifters.

SUMMARY OF THE INVENTION

The aforementioned shortcomings are eliminated by a medical device positioning system including a push-button controller, control system that is electrically connected to the button, an actuator electrically connected to the control system, and a verification system. The essence of the advantage consists of the fact that the verification system contains a calculation module and accelerometer mechanically connected to the controller. The controller is mechanically connected to at least one button with a switching element. The accelerometer is also electrically connected to the calculation module. The calculation module is also a part of the control system, which also contains at least one control unit. The advantage is improved safety against accidental pressing, which is desirable for medical devices.

It benefits from the button consisting of a microswitch or membrane keypad.

It benefits from the calculation module being an integral part of the controller.

It benefits from the controller being a foot operated.

A preferred method of using a medical device positioning system is that after activation of the button its switching element switches on and generates an electrical signal and a mechanical impact. The electrical signal generated by the switching element is transferred to the control system and the mechanical impact detected by an accelerometer, which then generates an electrical signal and sends it to the calculation module where it is then evaluated. The information is transferred to the control system, which, on the basis of this information and the electrical signal generated by the switching element, activates the actuator.

This means of evaluation is suitable for eliminating dangerous states. A dangerous state may be, for example, the cracking or breaking of a flexible switching element due to material fatigue or mechanical damage, in which case an unintended electrical signal may be generated. However, during this situation there may not necessarily be any mechanical impact. In other cases, a random mechanical impact may be generated, but there may not necessarily be an electrical signal generated by the switching element.

EXAMPLE OF A VERSION OF THE INVENTION

Figure 1:
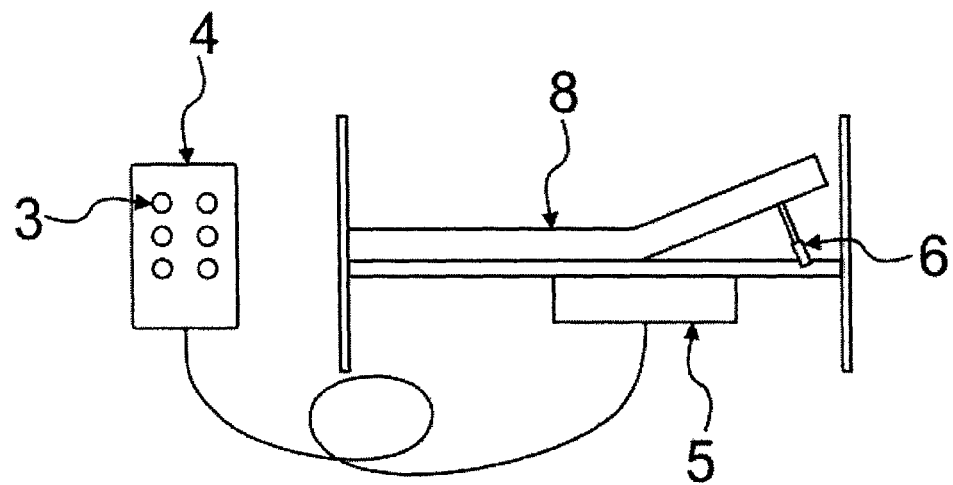
FIG. 1 is a diagrammatic representation of a system for positioning a medical device comprising a medical device, an actuator, and a control system connected to a controller with one or more buttons.
Figure 2:
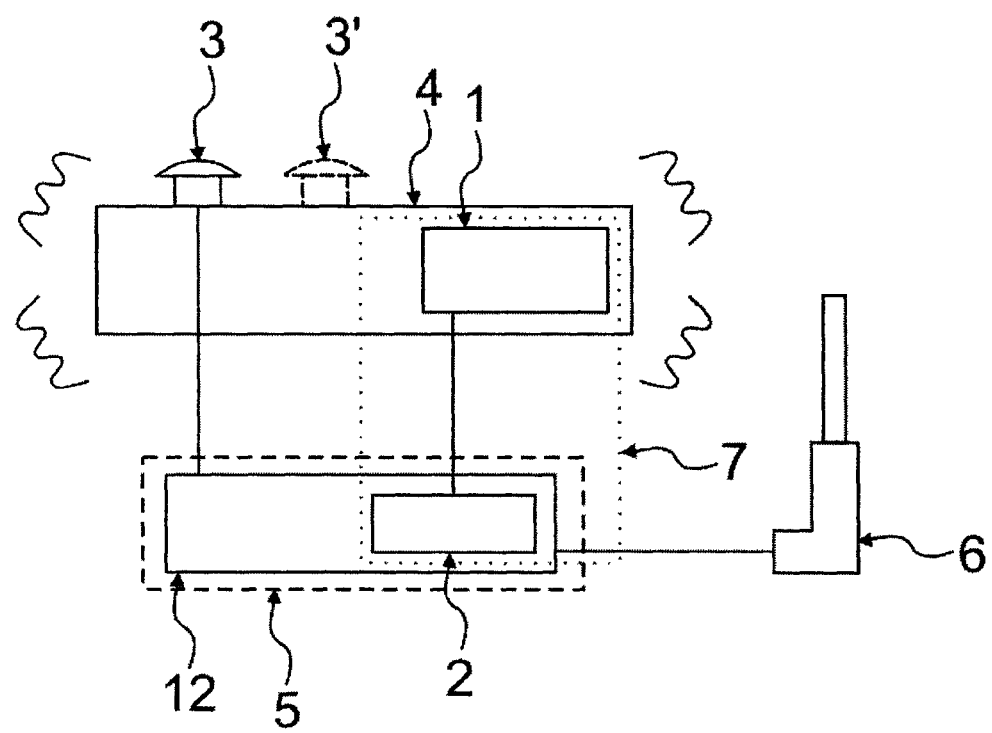
FIG. 2 is a diagrammatic representation of an exemplary medical device positioning system.
Figure 3:
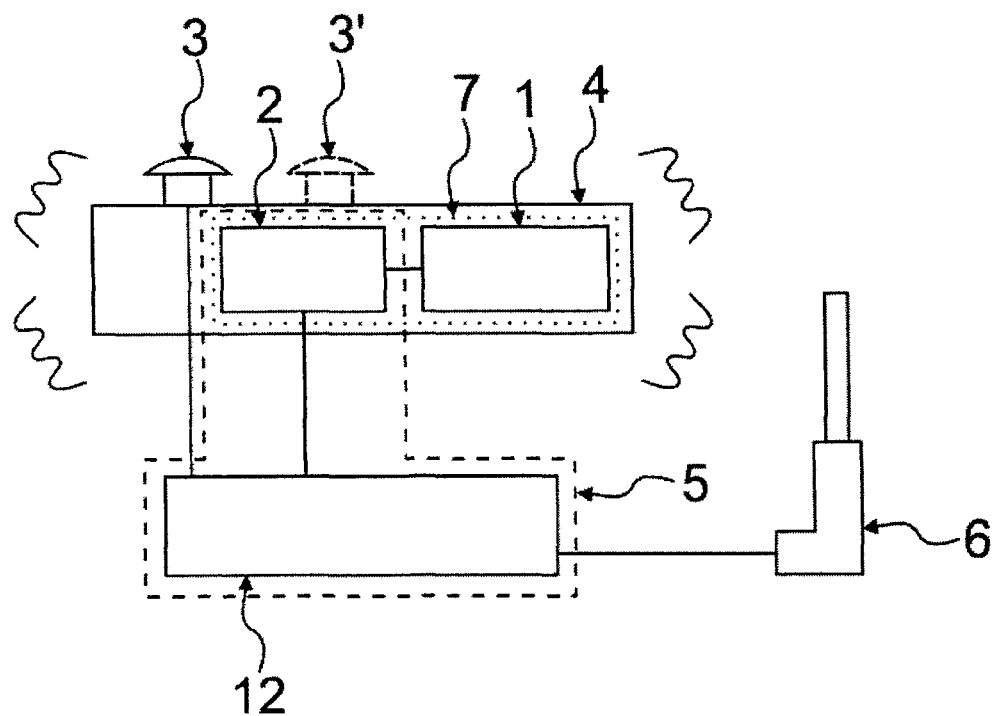
FIG. 3 is a diagrammatic representation of another medical device positioning system.
Figure 4:
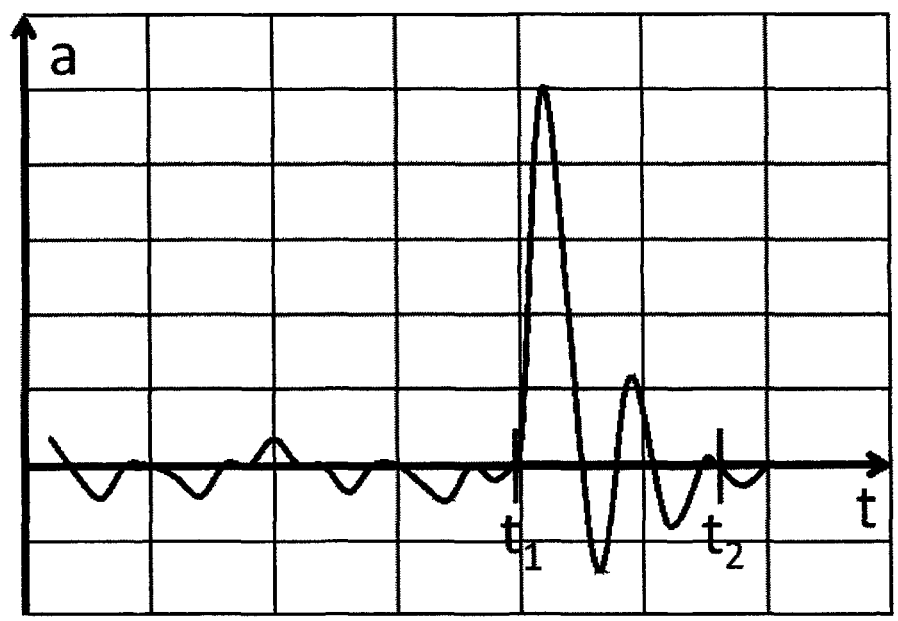
FIG. 4 is a graph depicting output characteristics of a detected signal of an accelerometer in a single axis.
Figure 5:
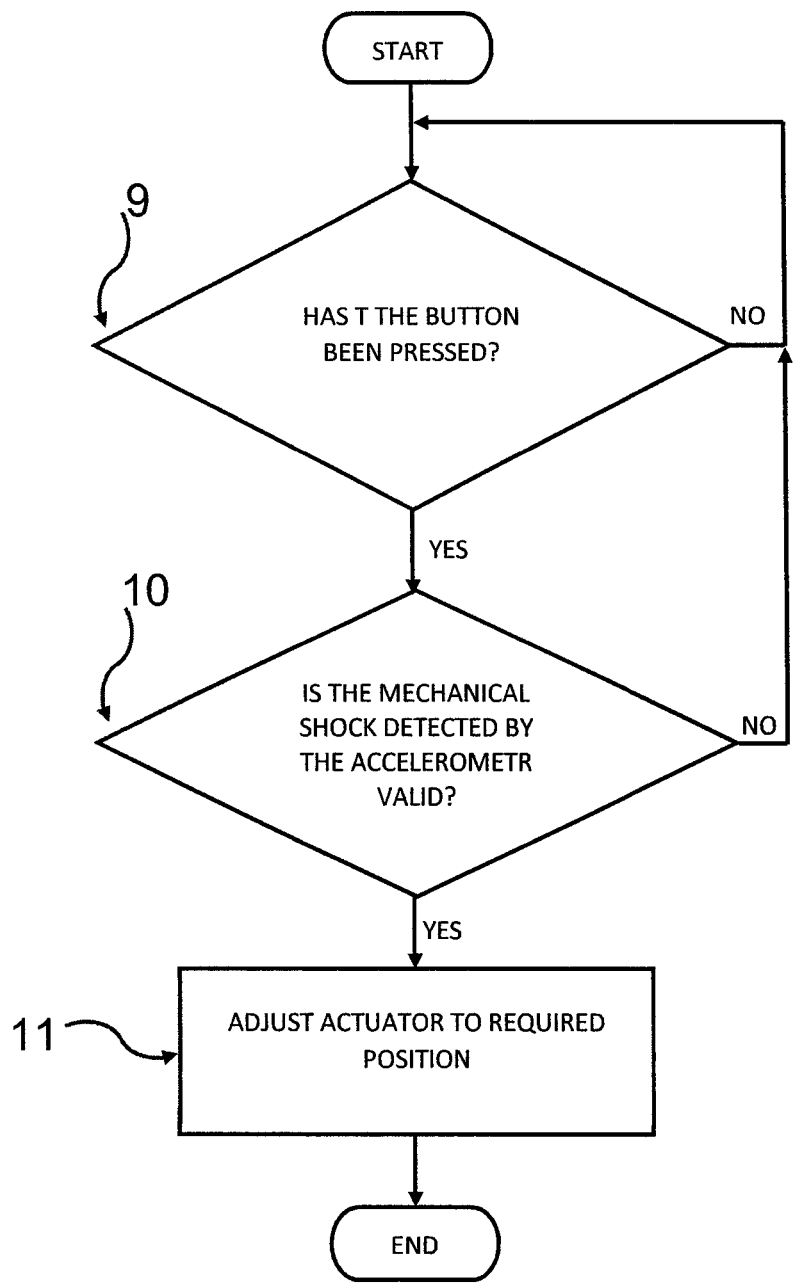
FIG. 5 is a flow diagram of an exemplary evaluation algorithm.
Figure 6:
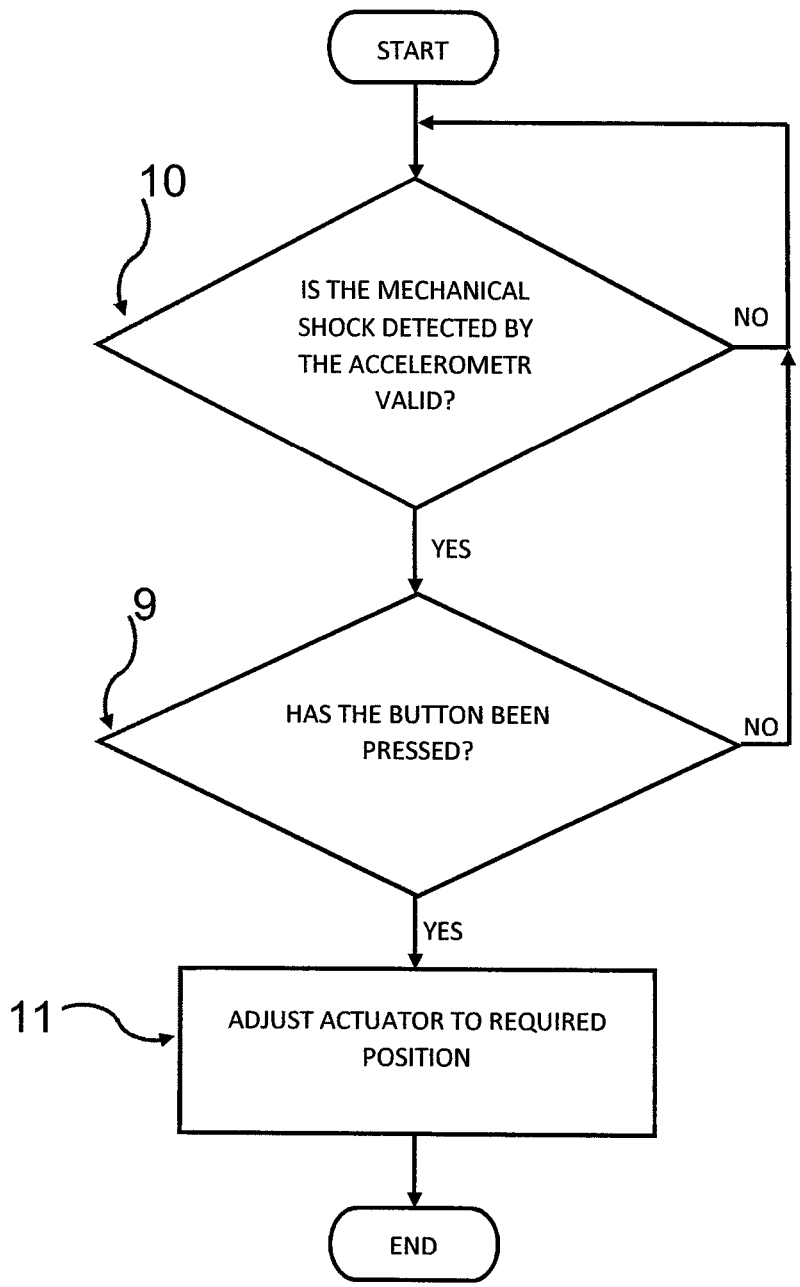
FIG. 6 is a flow diagram of another evaluation algorithm.

One example of a version of the invention is a medical device positioning system according to picture 1. The medical device positioning system consists of a medical device 8, which may be a hospital bed, nursing bed, transport bed, transport chair, bedside cabinet, medical equipment holder, anti-decubitus mattress, or patient lifter. It also consists of an actuator 6 electrically connected to and controlled by a control system. The actuator 6 configures, for example, the backrest of the bed, the entire mattress platform of the bed, the patient lifter, or any other configurable part of the medical device 8. The control system 5 is electrically connected to the controller 4. The controller 4 may be hand operated, foot operated, or integrated into the medical device 8. In hospital beds the controller 4 may be located, for example, in the side rail. The controller 4 contains one or more buttons 3, 3'. The handset 4 is flexibly connected to the medical device 8, and the flexible connection to the medical device 8 may, for example, be wired by cable, or wireless using radio, optical, or sonic communication. The controller 4 contains one or more buttons 3, 3'.

A block diagram of a suggested version of a medical device positioning system is described according to picture 2. The medical device positioning system consists of a controller 4 containing one or more buttons 3, 3'. The button 3 may be for example, a micro switch on a printed circuit board, or a membrane keypad with flexible contact, or any other switch with a mechanical switching mechanism. The button 3 is electrically connected to the control system 5. The controller 4 also contains an accelerometer 1 mechanically linked to a printed circuit board or controller 4 on the medical device and is connected internally or externally and electrically to a calculation module 2. The accelerometer 1 is also a part of the verification system 7. One part of the verification system 7 is also a calculation module 2. The calculation module 2 evaluates the output characteristics of the accelerometer if a certain waveform of mechanical impact is detected in the output characteristics of the accelerometer, a signal is sent to the control system 5, of which the calculation module is a 2 part. The control system 5 also consists of a control unit 12. The control system 5 working according to the algorithm in picture 5 or picture 6 is connected electrically to the actuator 6.

Another block diagram of a possible version of a medical device positioning system is described according to picture 3. The system consists of a controller 4 containing one or more buttons 3, 3'. The button 3 may be for example, a micro switch on a printed circuit board, or a membrane keypad with flexible contact, or any other switch with a mechanical switching mechanism. The button 3 is electrically connected to the control system 5. The controller 4 also contains an accelerometer 1 mechanically linked to a printed circuit board or controller 4 and is connected internally or externally and electrically to a calculation module 2. The accelerometer is also a part of the verification system 7. The verification system 7 also contains a calculation module 2 located in the controller 4. The calculation module 2 evaluates the output characteristics of the accelerometer if a certain waveform of mechanical impact is detected in the output characteristics of the accelerometer, a signal is sent to the control system 5 of which the calculation module is a 2 part. The control system 5 also consists of a control unit 12. The control system 5 working according to the algorithm in picture 5 or picture 6 is connected electrically with the actuator 6.

In picture 4 there is depiction of the output characteristics of the detected signal of the accelerometer 1 in a single axis. An accelerometer 1 detecting acceleration at least on one axis may be used. But it would be better to use a three-axis accelerometer 1, to make it possible to significantly narrow the set of impacts that are identified as an intentional pressing of the button. In this way, not only is the waveform of the absolute value of the deviation caused by the impact measured, but also its direction in 3D space. Impacts in the wrong direction (for example, impact to the controller on the plane of the area on which the buttons are located) are not recognised as valid even if the waveform of the actual amplitude elements were themselves correct. This means that tapping the controller from the side does not cause confirmation of a valid press. As is evident from picture 4, there is a muffled signal in the part characteristics 0 to t1 caused by the action of interfering elements, for example from hospital equipment. However, in the part of the characteristic $t_1$ to $t_2$, the expected waveform of mechanical impact indicating a very rapid start with subsequent and gradual settling back to the original muffled signal is depicted. This waveform of the mechanical impact may be one element of the output characteristics from which it is filtered. The waveform of the mechanical impact results from closing the switching element of button 3. The switching element of button 3 may be, for example, a flexible membrane capable of inducing a mechanical impact, which, after compressing the spring in button 3 switches to the on position, causing a mechanical impact and also closing the electrical contacts.

One example of a suitable version of the evaluation algorithm is derived from the steps according to the block diagram in picture 5. The button 3 and block 9 are used to evaluate whether button 3 was pressed. If it determines that button 3 has been pressed, it continues to block 10 detected mechanical impacts, otherwise the entire process returns to the state before block 9 press button 3. In the recorded mechanical impact block 10 data measured by the accelerometer 1 is evaluated when the switching element of the button is flipped, and the resultant mechanical impact corresponds to the waveform of the required mechanical impact. The waveform of the mechanical impact differs if, for example, button 3 is pressed by the patient lying on the controller 4 or if by impact of the controller 4 on the corner of a table button 3 is subsequently pressed, or if the operator moves the controller 4 and simultaneously presses button 3. In such cases the waveform of the function is sought. If the values of the input characteristics of the accelerometer 1 correspond to the required mechanical impact waveform are identified, there is continuation to block 11 of actuator 6 configuration, otherwise the entire evaluation process returns to the state before block 9 of button 3 pressed. In the actuator 6 configuration block 11, based on an evaluation of the button 3 press block 9 as well as a detected mechanical impact block, the actuator is configured in the required position depending on the relevant function of the pressed button 3.

Another possible version of the evaluation algorithm is derived from the steps according to the block diagram in picture 6. The detected mechanical impact block 10 is used to evaluate whether the data measured by the accelerometer 1 depending on the acting forces corresponds to the required waveform of the mechanical impact. The waveform of the mechanical impact differs if, for example, button 3 is pressed by the patient lying on the controller 4 or by the impact of the controller 4 on the corner of a table and button 3 is subsequently pressed, or if the operator moves the controller 4 and at the same time presses button 3. In such cases the desired waveform of a mechanical impact is sought. If the values of the input characteristics of the accelerometer 1 are evaluated corresponding to the waveform of the required mechanical impact, there is continuation to block 9 of button 3 pressed. Otherwise the entire evaluation process returns to the point before block 10 of detected mechanical impact. The button 3 press block 9 is used to evaluate whether button 3 was pressed or whether there was just a random mechanical impact. If it is determined that button 3 was pressed, it continues to block 11 of actuator 6 configuration, otherwise the entire process returns to the state before block 10 of detected mechanical impact. In the actuator 6 configuration block 11, based on evaluation of button 3 press block 9 and detected mechanical impact block 10, the actuator is configured in the required position depending on the relevant function of the pressed button 3.

Another version of the evaluation algorithm is given here. Evaluation in block 10 of detected mechanical impact, whether the data measured by the accelerometer 1 depending on the acting forces corresponds to the waveform of mechanical impact, and in button 3 press block 9, whether button 3 was pressed and occurs at the same time. The waveform of the mechanical impact differs if, for example, button 3 is pressed by the patient lying on the controller 4 or by the impact of the controller 4 on the corner of a table and button 3 is subsequently pressed, or if the operator moves the controller 4 and presses the button 3 at the same time. In these cases the desired waveform of mechanical impact is sought. If the values of the output characteristic of the accelerometer 1 correspond to the required mechanical impact waveform in the detected mechanical impact block 10 and also in button 3 press block 9 button 3 was pressed, it continues to actuator 6 configuration block 11, otherwise the evaluation process is repeated. In the actuator 6 configuration block 11, based on an evaluation of button 3 press block 9 and also a detected mechanical impact 10 block, the actuator is configured in the required position depending on the relevant function of the pressed button 3.

LIST OF REFERENCE SKINS

1—accelerometer
2—calculation module
3—button
4—controller
5—control system
6—actuator
7—verification system
8—medical device
9—button press block
10—detected mechanical impact block
11—actuator configuration block
12—control unit

The invention claimed is:

1. A medical device, comprising:
a configurable part, and
a positioning system for configuring the configurable part, the positioning system comprising a controller with a button, control system electrically connected to the button, an actuator electrically connected to the control system, a verification system calculation module and an accelerometer, wherein the accelerometer is mechanically connected to the controller to detect impacts caused by closing a switching element of the button wherein the controller is also mechanically connected to the button, which is fitted with the switching element, and the accelerometer also being electrically connected to the calculation module, which is a part of the control system which comprises at least one control unit, and wherein the calculation module is configured to evaluate output characteristics of the accelerometer and detect certain waveform of the mechanical impact, and wherein the actuator is activatable to configure the configurable part based on an electrical signal from the switching element and the output characteristics of the accelerometer.

2. The medical device according to claim 1 wherein the button comprises a microswitch or membrane keypad.

3. The medical device according to claim 1 wherein the calculation module is an integral part of the controller.

4. The medical device according to claim 1 wherein the controller is foot controller, hand controller, or controller integrated into the medical device.

5. The medical device according to claim 4 wherein the handset is connected to the medical device wirelessly or by wire.

6. The medical device according to claim 1 wherein the accelerometer is constructed as a three-axis.

7. The medical device according to claim 1 wherein after pressing the button its switching element is closed and generates the electrical signal and a mechanical impact at the same time, the electrical signal generated by the switching element being transferred to the control system while the mechanical impact is detected by the accelerometer and the electrical signal generated by the accelerometer is sent to the calculation module where the electrical signal is evaluated by detecting certain waveform of mechanical impact than processed information is sent to the control system, wherein the control unit on a basis of this information and the electrical signal activates the actuator.

8. The medical device according to claim 1 wherein the medical device is selected from a group of medical devices comprising a hospital bed, nursing bed, transport bed, transport chair, bedside cabinet, medical equipment holder, anti-decubitus mattress or patient lifter.

9. The medical device according to claim 1 wherein the configurable part is selected from a group of configurable parts comprising a backrest, a mattress platform or a patient lifter.

10. A medical device, comprising:
a configurable part, and
a positioning system for configuring the configurable part, the positioning system comprising a controller with a button, control system electrically connected to the button, an actuator electrically connected to the control system, an accelerometer, wherein the accelerometer is mechanically connected to the controller to detect impacts caused by closing a switching element of the button wherein the controller is also mechanically connected to the button, which is fitted with the switching element, and the accelerometer also being electrically connected to the control system which comprises at least one control unit, and wherein the control system is configured to evaluate output characteristics of the accelerometer and detect certain waveform of the mechanical impact, and wherein the actuator is activatable to configure the configurable part based on an electrical signal from the switching element and the output characteristics of the accelerometer.

11. The medical device according to claim 10 wherein the button comprises a microswitch or membrane keypad.

12. The medical device according to claim 10 wherein the calculation module is an integral part of the controller.

13. The medical device according to claim 10 wherein the controller is foot controller, hand controller, or controller integrated into the medical device.

14. The medical device according to claim 13 wherein the handset is connected to the medical device wirelessly or by wire.

15. The medical device according to claim 10 wherein the accelerometer is constructed as a three-axis.

16. The medical device according to claim 10 wherein after pressing the button its switching element is closed and generates the electrical signal and a mechanical impact at the same time, the electrical signal generated by the switching element being transferred to the control system while the mechanical impact is detected by the accelerometer and the electrical signal generated by the accelerometer is sent to the calculation module where the electrical signal is evaluated by detecting certain waveform of mechanical impact than processed information is sent to the control system, wherein the control unit on a basis of this information and the electrical signal activates the actuator.

17. The medical device according to claim 10 wherein the medical device is selected from a group of medical devices comprising a hospital bed, nursing bed, transport bed, transport chair, bedside cabinet, medical equipment holder, anti-decubitus mattress or patient lifter.

18. The medical device according to claim 10 wherein the configurable part is selected from a group of configurable parts comprising a backrest, a mattress platform or a patient lifter.

* * * * *